(12) United States Patent
Hsieh et al.

(10) Patent No.: US 11,059,746 B2
(45) Date of Patent: Jul. 13, 2021

(54) THERMOPLASTIC CYCLOALIPHATIC POLYAMIDE MATRIX RESINS FOR NEXT-GENERATION ENERGY ABSORBING APPLICATIONS

(71) Applicant: U.S. Army Research Laboratory, Adelphi, MD (US)

(72) Inventors: Alex J. Hsieh, Winchester, MA (US); Tanya L. Chantawansri, Abingdon, MD (US)

(73) Assignee: America as represented by the Secretary of the Army, Washington, DC (US)

( * ) Notice: Subject to any disclaimer, the term of this patent is extended or adjusted under 35 U.S.C. 154(b) by 628 days.

(21) Appl. No.: 14/822,396

(22) Filed: Aug. 10, 2015

(65) Prior Publication Data
US 2017/0044059 A1    Feb. 16, 2017

(51) Int. Cl.
*C03C 25/328*  (2018.01)
*C03C 25/50*   (2006.01)
(Continued)

(52) U.S. Cl.
CPC .............. *C03C 25/328* (2013.01); *B32B 5/08* (2013.01); *B32B 27/12* (2013.01); *B32B 27/34* (2013.01); *C03C 25/1095* (2013.01); *C03C 25/50* (2013.01); *C08J 5/042* (2013.01); *C08J 5/043* (2013.01); *D06M 15/564* (2013.01); *D06M 15/59* (2013.01); *D06M 17/00* (2013.01); *F41H 5/0485* (2013.01); *B32B 2260/021* (2013.01); *B32B 2260/046* (2013.01); *B32B 2262/0253* (2013.01); *B32B 2262/0269* (2013.01); *B32B 2262/101* (2013.01); *B32B 2262/106* (2013.01); *B32B 2262/14* (2013.01); *B32B 2307/702* (2013.01); *B32B 2307/732* (2013.01); *B32B 2571/02* (2013.01); *C08J 2375/04* (2013.01); *C08J 2377/06* (2013.01)

(58) Field of Classification Search
USPC ....... 428/167, 192, 134.137; 89/36.02; 2/2.5
See application file for complete search history.

(56) References Cited

U.S. PATENT DOCUMENTS

| 3,620,905 | A | 11/1971 | Ahramjiam |
| 3,771,418 | A | 11/1973 | Gulbierz et al. |

(Continued)

FOREIGN PATENT DOCUMENTS

| WO | WO 0014137    | 3/2000 |
| WO | WO 2007050542 | 5/2007 |
| WO | WO 2012126934 | 9/2012 |

OTHER PUBLICATIONS

Moy et al., Proceedings of the 2003 ASME IMECE: 2003 ASME International Mechanical Engineering Congress and R&D Expo Nov. 15-21, 2003 Washington, D.C.

(Continued)

Primary Examiner — Lynda Salvatore
(74) Attorney, Agent, or Firm — Christos S. Kyriakou

(57) ABSTRACT

Provided are materials that include one or more cycloaliphatic polyamides integrated into or coated onto one or more structural fibers such as polyethylene fibers, aramid-fibers, glass fibers or carbon fibers. The resulting materials may be incorporated into composite articles suitable for use as protective equipment or structural layers.

11 Claims, 12 Drawing Sheets

(51) Int. Cl.
| | |
|---|---|
| D06M 15/59 | (2006.01) |
| D06M 17/00 | (2006.01) |
| C03C 25/1095 | (2018.01) |
| D06M 15/564 | (2006.01) |
| B32B 27/34 | (2006.01) |
| B32B 5/08 | (2006.01) |
| C08J 5/04 | (2006.01) |
| B32B 27/12 | (2006.01) |
| F41H 5/04 | (2006.01) |

(56) References Cited

U.S. PATENT DOCUMENTS

| | | |
|---|---|---|
| 4,208,507 A | 6/1980 | Stutz et al. |
| 4,569,982 A | 2/1986 | Grogler et al. |
| 4,581,433 A | 4/1986 | Potter et al. |
| 4,916,000 A | 4/1990 | Li et al. |
| 5,510,445 A | 4/1996 | Haider et al. |
| 5,654,053 A | 8/1997 | Crane et al. |
| 5,688,860 A | 11/1997 | Croft |
| 5,690,526 A | 11/1997 | Lin et al. |
| 5,731,367 A | 3/1998 | Lee |
| 5,962,617 A | 10/1999 | Slagel |
| 6,127,505 A | 10/2000 | Slagel |
| 6,258,917 B1 | 7/2001 | Slagel |
| 6,649,727 B1 | 11/2003 | Anderson et al. |
| 7,037,865 B1 | 5/2006 | Kimberly |
| 7,300,893 B2 | 11/2007 | Barsoum et al. |
| 7,354,357 B2 | 4/2008 | Sullivan et al. |
| 7,919,418 B2 | 4/2011 | Bhatnagar et al. |
| 7,938,053 B1 | 5/2011 | Dudt |
| 8,178,644 B2 | 5/2012 | Derderian et al. |
| 8,256,019 B2 | 9/2012 | Ardiff et al. |
| 8,372,939 B1 | 2/2013 | Derderian et al. |
| 8,399,094 B2 | 3/2013 | Rukavina et al. |
| 8,715,113 B2 * | 5/2014 | Loper .............. A63B 37/0003 473/376 |
| 2006/0252577 A1 | 11/2006 | Sullivan et al. |
| 2007/0100112 A1 | 5/2007 | Sarpeshkar et al. |
| 2007/0111621 A1 | 5/2007 | Barsoum |
| 2007/0248827 A1 | 10/2007 | Rukavina et al. |
| 2012/0174761 A1 | 7/2012 | Dabich, II et al. |
| 2012/0186002 A1 | 7/2012 | Bhatnagar et al. |
| 2012/0196108 A1 | 8/2012 | Bhatnagar et al. |
| 2014/0045612 A1 * | 2/2014 | Sullivan ............ A63B 37/0039 473/373 |
| 2014/0107291 A1 | 4/2014 | Eisen et al. |

OTHER PUBLICATIONS

Alex J. Hsieh, et al., "Poly(Urethane Urea)s with Tunable Microstructures—From Robust Mechanical Strengthening to Chemical Hardening," 27th Army Science Conference, Nov. 29-Dec. 2, 2010.
Yu, J. H. and Hsieh, A. J. "Real-time Dynamic Impact Strain Deformation Measurements of Transparent Poly(urethane urea) Materials" Army Research Laboratory at Aberdeen Proving Ground, MD (2010).
R. G. Rinaldi, A. J. Hsieh, M. C. Boyce, "Tunable Microstructures and Mechanical Deformation in Transparent Poly (urethane urea)s," Journal of Polymer Science: Part B: Polymer Physics 2010, 49, 123-135 (2010).
Alex J. Hsieh, Joshua A. Orlicki, and Rick L. Beyer, "Molecular Design of Novel Poly(urethane-urea) Hybrids as Helmet Pads for Ballistic and Blast Trauma Mitigation," ARL-TR-4764, U.S. Army Research Laboratory, Mar. 2009.
Alex J. Hsieh, Sai S. Sarva, and Norman Rice, "Improved Dynamic Strain Hardening in Poly(Urethane Urea) Elastomers for Transparent Armor Applications," ARL-RP-280, U.S. Army Research Laboratory, Sep. 2009.
Alex J. Hsieh, et. al. "New insight into microstructure-mediated segmental dynamics in select model poly(urethane urea) elastomers," Polymer 55 (2014) 1883-1892.
Parimal J. Patel, Alex J. Hsieh, Gary A. Gilde, "Improved Low-Cost Multi-Hit Transparent Armor," 25th Army Science Conference, Orlando FL. (2006).
C. M. Roland, R. Casalini, "Effect of hydrostatic pressure on the viscoelastic response of polyurea", Polymerx 48 (2007) 5747-5752.
R. B. Bogoslovov, C. M. Roland, and R. M. Gamache, "Impact-induced glass transition in elastomeric coatings," Appl. Phys. Lett. 90, 221910-12 (2007).
Paul E. Warth and Gary M. Gladysz PhD, "Protective Materials for Maritime Vessels," MAST 2009.
Sai S. Sarva and Alex J. Hsieh, "The effect of microstructure on the rate-dependent stress—strain behavior of poly (urethane urea) elastomers," Polymer 50 (2009) 3007-3015.
TROGAMID® CX Transparent polyamides with an outstanding combination of properties. Evonik Industries. (2009).
Dureflex® A4700 Optical Aliphatic Polyether Polyurethane Film Product Information. Bayer MaterialSciences (May 2010).
Michelle K. Nyein et al., "In Silico Investigation of Intracranial Blast Mitigation with Relevance to Military Traumatic Brain Injury", A Proceedings publication of the National Academy of Sciences publication, 107, 48, 20703-20708 (2010).
MAJ Jason A. Morneault, "Head Protection," Advanced Planning Brief to Industry, (slide presentation) May 11-12, 2011.
Lionel R. Vargas-Gonzalez, Shawn M. Walsh, and James C. Gurganus, "Examining the Relationship Between Ballistic and Structural Properties of Lightweight Thermoplastic Unidirectional Composite Laminates," ARL-RP-0329, Army Research Laboratory, Aug. 2011.
Alex J. Hsieh and Kenneth E. Strawhecker, "Microstructure Analysis of Transparent Poly(urethane urea) Elastomers via AFM," (Paper and slide presentation), American Chemical Society National Meeting, Sep. 1, 2011.
Alex J. Hsieh, "Enabling Molecular Mechanisms for Tunable Microstructure and Properties Optimization of Transparent Elastomeric Materials," Defense Threat Reduction Agency, Chemical and Biological Materials Strategy Working Group Workshop, Sep. 15, 2011.
Honeywell Spectra Shield® II SR-3124 ballistic composite material for hard armor applications Product Information Sheet, © 2012 Honeywell International Inc.
Tanya Chantawansri, Yelena Sliozberg, Alex Hsieh, Jan Andzelm, "Coarse grain modeling of the high-rate stress-strain behavior for select model Poly[urethane urea] (PUU) elastomers," (Slide presentation) American Physical Society March Meeting, Feb. 29, 2012.
Renlong Gao, Mingqiang Zhang, Ninad Dixit, Robert B. Moore, Timothy E. Long, "Influence of ionic charge placement on performance of poly(ethylene glycol)-based sulfonated polyurethanes," Polymer 53 (2012) 1203-1211.
F.R. Svingala, M.J. Hargather, G.S. Settles, "Optical techniques for measuring the shock Hugoniot using ballistic projectile and high-explosive shock initiation," International Journal of Impact Engineering 50 (2012) 76-82.
Tanya L. Chantawansri, Yelena R. Sliozberg, Jan W. Andzelm, Alex J. Hsieh, "Coarse-grained modeling of model poly (urethane urea)s: Microstructure and interface aspects," Polymer 53 (2012) 4512-4524.
Tanya Chantawansri, Yelena Sliozberg, Jan Andzelm, Alex Hsieh, "High strain-rate mechanical deformation via coarse grain modeling for select model poly(urethane urea) elastomers," (Abstract and slide presentation) 244th ACS National Meeting, Aug. 22, 2012.
Alex J. Hsieh, Jeffrey K. Eliason, and Keith A Nelson, "Impulsive Stimulated Scattering Measurements of Select Model Transparent Elastomers," ARL-TR-6167, Army Research Laboratory, Sep. 2012.
Weiguo Hu, Alex J. Hsieh, Tanya L. Chantawansri, "A Solid-State NMR Method to Characterize Phase-Mixing Morphology in Poly(urethane urea)" (slide presentation), American Physical Society Meeting, Mar. 22, 2013.
Weiguo Hu and Alex J. Hsieh, "A Solid-State NMR Characterization of Phase-Mixing Morphology in Poly(urethane urea)" (slide presentation), American Chemical Society Meeting, Apr. 10, 2013.
Tanya L. Chantawansri and Alex J. Hsieh, "Pathway towards the Rational Design of High Performance Elastomers: From Molecules-by-Design to Multiscale Modeling" (slide presentation given remotely

(56) References Cited

OTHER PUBLICATIONS from the Army Research Laboratory, Aberdeen Proving Ground, MD), 2013 MACH Conference, Army Research Laboratory, Apr. 12, 2013.
"ACH-shaped Batlskin Viper V2 Helmet," Ground Combat Technology, vol. 4, Issue 1, Apr. 2013, p. 15.
Daniel T. Casem and Alex J. Hsieh, "Plate-Impact Measurements of a Select Model Poly(urethane urea) Elastomer," ARL-TR-6482, Army Research Laboratory, Jun. 2013.
Alex J. Hsieh and Tanya L. Chantawansri, "New Insight into Multi-functional Hierarchical Poly(urethane urea) Elastomers: From Molecules-by-Design to Multiscale Modeling," (Abstract), TMS, Mar. 3-7, 2013.
Tanya L. Chantawansri, Yelena R. Sliozberg, Alex J. Hsieh, and Robert A. Riggleman, "Quantifying segmental dynamics of model poly(urethane urea) systems using computational modeling," (Abstract), American Physical Society March Meeting, Mar. 22, 2013.
Weiguo Hu, Alex J. Hsieh, B. Christopher Rinderspacher, Tanya L. Chantawansri, "Structure and Dynamics Characteristics of HDMI and MDI-based Poly(urethane urea) Elastomers via Solid-State NMR," (Abstract), American Physical Society March Meeting, Mar. 22, 2013.
Weiguo Hu, and Alex J. Hsieh, "Solid-State NMR Characterization of a Select Model Poly(urethane urea) Elastomer," (Abstract), American Chemical Society Meeting, Apr. 11, 2013.
Kenneth E. Strawhecker, Alex J. Hsieh Tanya L. Chantawansri, Z. Ilke Kalciogiu, Krystyn J, Van Vliet, "Influence of microstructure on micro-/nano-mechanical measurements of select model transparent poly(urethane urea) elastomers," Polymer 54 (2013) 901-903.
Rosthauser, J. W. Haider, K. W. Steinlein, C. and Eisenbach C. D., "Mechanical and Dynamic Mechanical Properties of Polyurethane and Polyurethane/polyurea Elastomers Based on 4,4'-diisocyanatodicyclohxyl methane" J. Apple Polym. Sci., 64:957-970 (2011).

* cited by examiner

THERMOPLASTIC CYCLOALIPHATIC POLYAMIDE MATRIX RESINS FOR NEXT-GENERATION ENERGY ABSORBING APPLICATIONS

GOVERNMENT INTEREST

The invention described herein may be manufactured, used, and licensed by or for the United States Government.

FIELD

The invention relates to the absorption or redirection of energy such as from a projectile or a blast wave contacting a surface. More specifically, compositions are provided that are capable of undergoing cooperative molecular conformation changes, wherein relaxations associated with conformation changes yield enhanced energy absorption and/or dissipation.

BACKGROUND

The U.S. Army is continually pursuing new enabling materials and processing technologies to provide next generation Enhanced Combat Helmet (ECH) systems with enhanced Warfighter's Survivability. In the ECH design, state-of-the-art ultrahigh molecular weight polyethylene (UHMWPE) based fiber reinforcements, along with thermoplastic matrix materials, have demonstrated improved ballistic mass efficiency over the currently fielded Advanced Combat Helmet (ACH) systems which use traditional thermoset phenolic resins. Even so, these lightweight, high performance thermoplastic based composite prepreg materials in ECH systems can potentially introduce greater back face deflection when engaged by projectiles, which could result in increased behind-helmet blunt trauma. In both the ACH and ECH designs, the use of advanced helmet pads is considered as part of the potential materials solution; however, no mitigation strategy for protection against back face deflection derived directly based on the dynamic response of matrix polymers has been realized.

Almost every ACH and ECH helmet design utilizes a single matrix material. The single-matrix design, however, may not be sufficient to fulfill the performance requirements for the next-generation helmet systems, particularly for protection against emerging ballistic threats and blast hazards. Much of the reasoning for single material design is that most system integration is derived from commodity materials based on the limited manufacturer's specifications.

As such, there is a need for new materials and designs for energy dissipating systems such as helmets, armor, shields, or other uses that require resistance to impact from a projectile or shock wave.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Provided are materials and articles that exploit novel changes in isomer conformations each with a different energy state, where such molecular conformational changes are coupled throughout a three-dimensional, interconnected hydrogen bonded network. Such novel changes allow for cooperative dissipation of impact energy that can be used in protective equipment, clothing, armor, or other uses where dissipation of mechanical energy throughout an impacted material is desired.

In some aspects, an energy dissipating composite material is provided where energy is dissipated through the use of a cycloaliphatic polyamide and a structural fiber where the cycloaliphatic polyamide is impregnated into or coated onto the structural fiber to form a composite material. Optionally, the cycloaliphatic polyamide matrix resin is amorphous. Optionally, the thermoplastic cycloaliphatic polyamide matrix resin includes a structure as a result of a stoichiometric reaction between a diamine and a diacid. The diamine is optionally: hexamethylenediamine; 1,4-phenyl-diamine (para-phenylenediamine); 1,3-phenyl-diamine (m-phenylenediamine); 1,4-diaminocyclohexane; 1,3-diaminocyclohexane; m-xylylenediamine; 4,4'-methylenebis(cyclohexylamine); 2,2,4-trimethyl hexamethylene diamine; 2,4,4-trimethyl hexamethylene diamine; or any mixture thereof. A diacid is optionally: terephthalic acid; isophthalic acid; succinic acid; glutaric acid; adipic acid; sebacic acid; dodecanedioic acid; azelaic acid; trimethyl adipic acid; 1,4-cyclohexanedicarboxylic acid; 1,3-cyclohexanedicarboxylic acid; or any mixture thereof. Optionally, the diacid, diamine, or both have a functionality of 2. In some aspects, the cycloaliphatic polyamide includes one or more cyclohexyl moieties. Optionally, the cycloaliphatic polyamide is characterized by compressive flow stress values at strain rates of 2,200 per second that are higher in comparison with compressive flow stress values at strain rates of 0.01 per second.

The cycloaliphatic polyamide is impregnated into or coated onto a structural fiber to form a composite material. The structural fiber optionally includes polyethylene fiber, aramid fiber, carbon fibers, glass fibers, or combinations thereof. Such fibers are optionally in the form of an open woven fiber fabric.

In other aspects, a cycloaliphatic polyamide is used as a component of an energy dissipating composite material, optionally for use in protective equipment such as combat helmets, armor, shielding, or other device or material that benefits from dissipation of projectile energy. An energy dissipating composite material includes a first layer including a poly(urethane urea) impregnated into a first structural fiber, and a second layer on or directly on the first layer, the second layer including a thermoplastic cycloaliphatic polyamide. In some aspects, one or both of the poly(urethane urea) and thermoplastic cycloaliphatic polyamide are amorphous. Optionally, the thermoplastic cycloaliphatic polyamide matrix resin includes a structure as a result of a stoichiometric reaction between a diamine and a diacid. The diamine is optionally: hexamethylenediamine; 1,4-phenyl-diamine (para-phenylenediamine); 1,3-phenyl-diamine (m-phenylenediamine); 1,4-diamino cyclohexane; 1,3-diamino cyclohexane; m-xylylenediamine; 4,4'-methylenebis (cyclohexylamine); 2,2,4-trimethyl hexamethylene diamine; 2,4,4-trimethyl hexamethylene diamine; or any mixture thereof. A diacid is optionally: terephthalic acid; isophthalic acid; succinic acid; glutaric acid; adipic acid; sebacic acid; dodecanedioic acid; azelaic acid; trimethyl adipic acid; 1,4-cyclohexanedicarboxylic acid; 1,3-cyclohexanedicarboxylic acid; or any mixture thereof. Optionally, the diacid, diamine, or both have a functionality of 2. Optionally, the cycloaliphatic polyamide is characterized by compressive flow stress values at strain rates of 2,200 per second that are higher in comparison with compressive flow stress values at strain rates of 0.01 per second. The poly(urethane urea) is optionally formed of 4,4'-dicyclohexylmethane diisocyanate, diethyltoluenediamine, and poly(tetramethylene oxide). In some aspects, the cycloaliphatic polyamide includes one or more cyclohexyl moieties. The poly(urethane urea), and optionally the cycloaliphatic polyamide, is impregnated into or coated onto a structural fiber to form a composite material. The structural fiber of the poly(urethane urea) is optionally the same type or different type from a structural fiber associated with the cycloaliphatic polyamide. A structural fiber optionally includes polyethylene fiber, aramid fiber, carbon fibers, glass fibers, or combinations thereof. Such fibers are optionally in the form of an open woven fiber fabric. The material is optionally formed into the shape of a helmet, armor, face shield, or a transparent window element. A first layer is optionally positioned outside of said second layer where outside is toward an anticipated projectile.

DETAILED DESCRIPTION

Figure 1B:
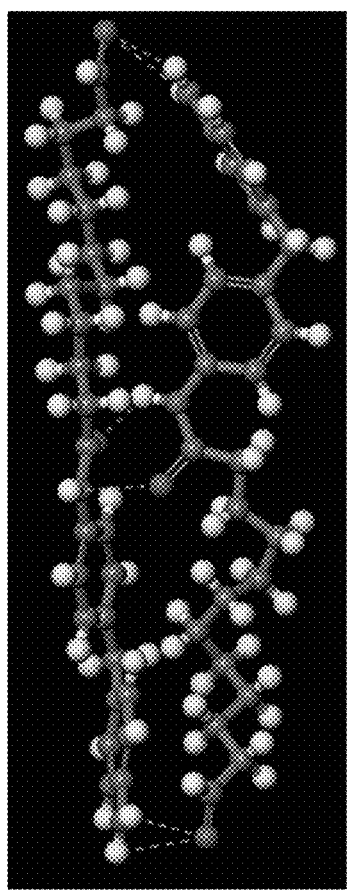
FIG. 1B illustrates a molecular model of a comparator material of an exemplary aromatic polyamide material formed of dodecanedioic acid and 4,4'-methylenedianiline.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "matrix" is defined as a predominantly-amorphous synthetic organic material and optionally thermally-processable.

As used herein, the term "thermoplastic" is defined as a polymeric material that becomes pliable or moldable above a specific temperature and solidifies upon cooling.

The term "cycloaliphatic" refers to a ring conformation of carbon and hydrogen atoms, optionally saturated or partially unsaturated. In particular aspects, all cycloaliphatic components of a claimed material are saturated.

The term "prepreg" refers to a material element comprising a network of structural fibers pre-consolidated in a polymer matrix material that can be further processed under heat and pressure to form a consolidated composite or component part. A prepreg may be fabricated from one layer of fibers or from a plurality of fiber layers in some instances.

Provided are materials and articles that exploit novel thermoplastic cycloaliphatic polyamides capable of undergoing cooperative molecular conformation changes. Cooperative molecular conformation changes are relaxations associated with phase changes between conformations in the cycloaliphatic polyamides, linked together on the chain level through intermolecular hydrogen bonding. These cooperative molecular conformation changes provide molecular pathways leading to enhanced energy absorption and dissipation within the cycloaliphatic polyamide material. The synergic coupling between enhanced energy absorption and dissipation provide novel processes where energy absorption via transition between various isomer conformations in the cycloaliphatic moiety, each associated with a different energy state, are coupled throughout a three-dimensional, interconnected hydrogen bonded network, thus allowing for cooperative dissipation of impact energy.

As such, provided are materials that include one or more synthetic resins that include one or more cycloaliphatic polyamides where the cycloaliphatic polyamide(s) is coated onto or impregnated into one or more structural fibers. The materials and associated articles have utility as surfaces or structures that are capable of energy absorption and dissipation, where such energy is optionally provided by a projectile contacting the material, or a material that is associated with the inventive material. In some aspects, the cycloaliphatic polyamides serve as a matrix resin for incorporation with structural fibers for use in fabrication of fiber reinforced polyamide prepreg materials, which are optionally used for further consolidation with other thermoplastic elastomeric matrix based prepreg materials for next generation Enhanced Combat Helmet (ECH) applications, for inclusion in armor, spall layers, or any other system that will benefit from the cooperative molecular conformation changes present in the claimed materials.

Cycloaliphatic polyamides are reaction products of a stoichiometric mixture of a diamine and diacid. The diamine and diacid independently or both include one or more aliphatic cyclic rings capable of molecular conformation changes such as, for example, changes from one or more chair conformations to one or more boat conformations, or from one or more boat conformations to one or more chair conformations. A cycloaliphatic material is optionally saturated or partially unsaturated. In particular aspects, all cycloaliphatic components of a claimed material are saturated.

Figure 1A:
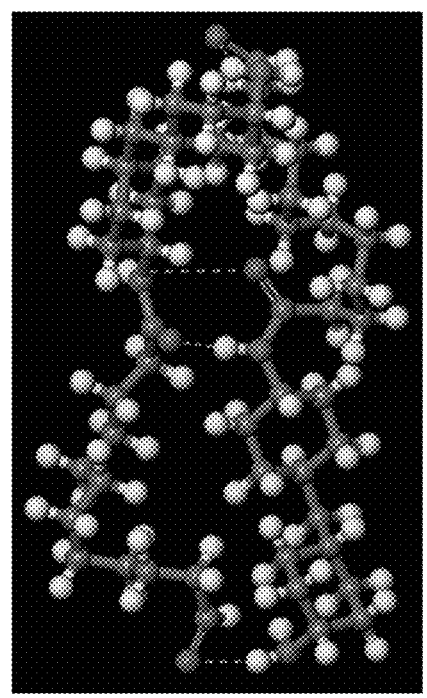
FIG. 1A illustrates a molecular model of an exemplary cycloaliphatic polyamide material formed of dodecanedioic acid and 4,4'-methylene-bis(cyclohexylamine)

The resulting thermoplastic cycloaliphatic polyamide material has the ability to absorb and dissipate energy such as from impact from a projectile through cooperative conformation changes within the cycloaliphatic polyamide material itself. FIG. 1A illustrates an exemplary cycloaliphatic polyamide material (dodecanedioic acid reacted with 4,4'-methylene-bis(cyclohexylamine)) FIG. 1B illustrates a similar material incorporating aryl groups in place of the saturated alkyl rings. Both FIG. 1A and FIG. 1B exhibit a significantly elongated structure, and a propensity to form hydrogen bonds within the material.

Figure 2:
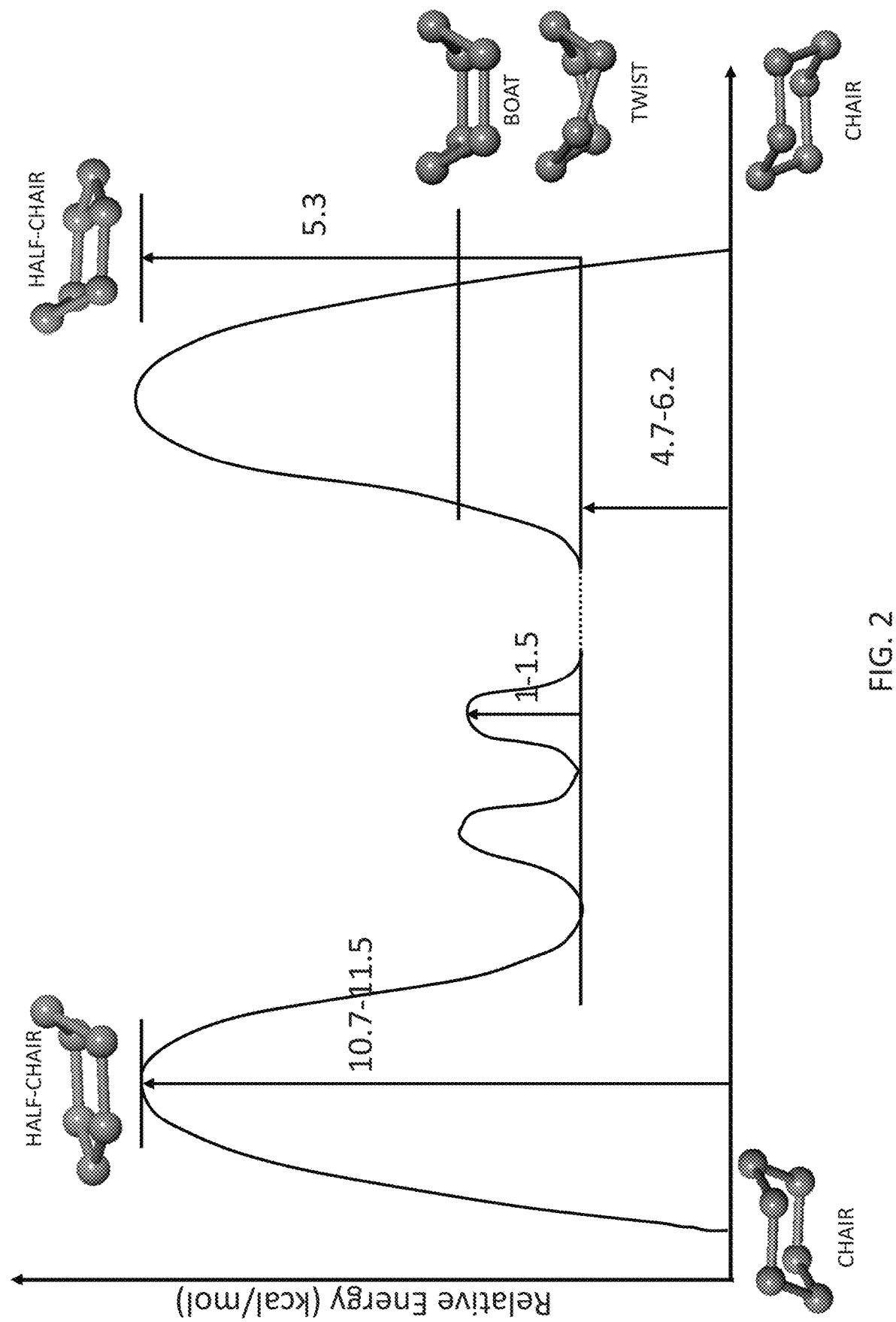
FIG. 2 illustrates the energy profile associated with the conformation changes of cyclohexane, a representative cycloaliphatic moiety in cycloaliphatic polyamide, where the chair conformer (potential energy minimum) is the preferred and most stable conformation for cyclohexane.

The saturated nature of the rings in the exemplary cycloaliphatic polyamide are essential to promoting the available cooperative conformational changes in the material upon contact with energy such as from a projectile FIG. 2 illustrates the energy profile associated with conformational change in cyclohexane, where the chair conformer (potential energy minimum) is the most stable conformation for cyclohexane. The energy barrier to ring inversion (or flipping) from one chair conformer to another chair conformer in cyclohexane is ~10.7-11.5 kcal/mol at 298° K. Additionally, the presence of a transient boat conformation on interchanging between two mirror-image twist-boat conformers occurs at a much lower energy barrier (~1-1.5 kcal/mol at 298° K) in comparison to that of chair-chair inversion. These cycloaliphatic conformation characteristics are believed to be unique and only present in cycloaliphatic polyamides, but are not available n any other aliphatic polyamides such as nylons or aromatic polyamides like Kevlar® materials.

In the exemplary cycloaliphatic polyamide, where every cycloaliphatic diamine monomer consists of two cycloaliphatic moieties, the conformational changes particularly for those which are associated with the transient, lower energy barrier are well coupled along the polymer chains as well as through intermolecular hydrogen bonding throughout a macroscopically three-dimensional hydrogen bonded network. This can potentially lead to synergistic, facile relaxation, which is favorable for energy absorption and dissipation during dynamic deformation. These unique, well-coupled conformational changes could also be a plausible molecular attribute, which can lead to an increase in the calculated average lifetime of hydrogen bonds in the exemplary cycloaliphatic polyamide, despite its relatively smaller average number percentage of hydrogen bonds, in comparison with a corresponding aromatic polyamide analog and nylon 6,6 and nylon 6,12, as shown in Table 1.

The product cycloaliphatic polyamide is optionally formed by reaction of a diamine with a diacid. A diamine is illustratively, but not limited to hexamethylenediamine, 1,4-phenyl-diamine (para-phenylenediamine), 1,3-phenyl-diamine (m-phenylenediamine), 1,4-diamino cyclohexane, 1,3-diaminocyclohexane, m-xylylenediamine, 4,4'-methyl-enebis(cyclohexylamine), 2,2,4-trimethyl hexamethylene diamine, 2,4,4-trimethyl hexamethylene diamine, and any mixture thereof. A diacid is illustratively, but not limited to, isophthalic acid, succinic acid, glutaric acid, adipic acid, sebacic acid, dodecanedioic acid, azelaic acid, trimethyl adipic acid, 1,4-cyclohexanedicarboxylic acid, 1,3-cyclohexanedicarboxylic acid, and any mixture thereof.

A cycloaliphatic polyamide is optionally amorphous and absent chemical cross-linking between molecules of cycloaliphatic polyamides. In such aspects, a cycloaliphatic polyamide is optionally free of crystalline form or polycrystalline form. In some aspects, the formation of the cycloaliphatic polyamide is achieved by reaction of a diamine and diacid with a functionality of 2, but no more, to ensure no or substantially no chemical cross-linking reaction occurred during synthesis.

In some aspects, a cycloaliphatic polyamide is the result of reaction of a cycloaliphatic diamine and a linear diacid, optionally a mixture of diacids. Optionally a cycloaliphatic diamine includes 1 or 2 cycloaliphatic rings, optionally saturated cycloaliphatic rings. An exemplary cycloaliphatic polyamide is CX-7323 available from Evonik Degussa, GmbH, Germany.

In polyamides, a hydrogen bond is formed between an amide hydrogen atom and an oxygen atom if the distance between the two atoms was less than 3 Å and also if the angle ∠N—H ... O was larger than 130°. Average percentages of available hydrogen bonds that are formed are shown in Table 1, where the total number of available amide hydrogen bond pairs in all four polyamide systems were kept the same in the simulation model. The resulting cycloaliphatic polyamide consisting of 4,4'-methylenebis(cyclohexylamine) and dodecanedioic acid optionally includes a hydrogen bonding density of less than 70 number percent at 300° K, optionally less than 65 number percent at 300° K, optionally less than 64 number percent at 300° K, optionally less than 63 number percent at 300° K. The resulting cycloaliphatic polyamide optionally includes a hydrogen bonding density of 58 to 64 number percent at 300° K, or any value or range therebetween.

Hydrogen bonding lifetime is a measure of ease of or resistance to conformational changes associated with interconnected hydrogen bonds at a particular temperature. Average lifetimes of hydrogen bonds were calculated by tracking the occurrence of hydrogen bonds as a function of time and were obtained by averaging lifetimes over all observed hydrogen bonds in the simulation model. A cycloaliphatic polyamide consisting of 4,4'-methylenebis(cyclohexylamine) and dodecanedioic acid optionally has an average hydrogen bonding lifetime in excess of 7.4 ps measured at 300° K. Optionally, a cycloaliphatic polyamide has an average hydrogen bonding lifetime in excess of 7.4 ps measured at 300° K. Optionally, a cycloaliphatic polyamide has an average hydrogen bonding lifetime in excess of 7.5 ps measured at 300° K. Optionally, a cycloaliphatic polyamide has an average hydrogen bonding lifetime in excess of 7.6 ps measured at 300° K. Optionally, a cycloaliphatic polyamide has an average hydrogen bonding lifetime in excess of 7.7 ps measured at 300° K. Optionally, a cycloaliphatic polyamide has an average hydrogen bonding lifetime in excess of 7.8 ps measured at 300° K. Optionally, a cycloaliphatic polyamide has an average hydrogen bonding lifetime in excess of 8.6 ps measured at 300° K. In some aspects, a cycloaliphatic polyamide has an average hydrogen bonding lifetime of 7.4 ps to 9.1 ps measured at 300° K, or any value or range therebetween.

Table 1 illustrates hydrogen bonding and hydrogen bond lifetime for several different polyamides.

TABLE 1

| Material | Avg. No. Percentage of H-bonds at 300K | Avg. lifetime of H-bonds at 300K (ps) |
| --- | --- | --- |
| nylon 6,6 | 73.4 +/− 0.73 | 6.98 +/− 0.02 |
| nylon 6,12 | 70.8 +/− 0.9 | 7.35 +/− 0.15 |
| cycloaliphatic polyamide | 62.0 +/− 2.1 | 8.81 +/− 0.13 |
| aromatic polyamide (consisting of dodecanedioic acid and 4,4'-methylenedianiline) | 65.2 +/− 1.8 | 6.33 +/− 0.29 |

Optionally, the cycloaliphatic polyamide is characterized by dynamic strengthening capability via ballistic impact with in-situ digital image correlation at impact velocity of 350 m/s. Both cycloaliphatic polyamide and polycarbonate exhibit similar deformation until ~60 μs after impact, and thereafter perforation occurs in polycarbonate yet TROG-AMID CX-7323 continues to deform, suggesting TROGAMID CX-7323 is more prone to dynamic strengthening than polycarbonate. This maintenance of integrity is due to the cooperative rearrangement of intermolecular hydrogen bonding and cycloaliphatic conformations available in the cycloaliphatic polyamides that is absent from polycarbonates. TROGAMID® CX refers to a series of crystallizable and permanently transparent polyamides, examples of which are made by Evonik Industries of Essen, Germany. More specifically, TROGAMID® CX polyamides consist of cycloaliphatic diamine and aliphatic dodecanedioic acid.

The molecular conformational changes in the cycloaliphatic polyamide can be characterized by compressive flow stress. A cycloaliphatic polyamide optionally has a compressive flow stress values at strain rates of 2,200/sec that are higher in comparison with compressive flow stress values at strain rates of 0.01/sec. In some aspects, a cycloaliphatic polyamide has a compressive flow stress values at strain rates of 2,200/sec that are about double or greater than the compressive flow stress values at strain rates of 0.01/sec, optionally at a true strain of between 0.1 and 0.3 of true strain when measured at a strain rate of 2,200 per second. In some aspects, the cycloaliphatic polyamide has a true stress of 100 MPa or greater at a true strain of 0.06 to 0.3 of true strain when measured at a strain rate of 2,200 per second.

The cycloaliphatic polyamide can further include one or more auxiliaries or additives conventionally used for transparent or opaque polyamides, examples being flame retardants, stabilizers, plasticizers, fillers, antistatic agents, dyes, pigments, mould-release agents, flow agents, and other polymers, or impact modifiers. The amount of all of the auxiliaries and additives is optionally at most 50% by weight in total, optionally at most 40% by weight, optionally at most 30% by weight, optionally at most 20% by weight.

A cycloaliphatic polyamide is optionally prepared by mixing the reactants optionally under conditions where block copolymers are produced via end-group reactions or transamidation. Conditions of this type, for example relatively high melt temperature and/or addition of a catalyst are known to the person skilled in the art. The molar ratio of diamine to diacid is optionally from 1:1.2 to 1.2:1, optionally 1:1.1 to 1.1:1, optionally 1:1. Suitable mixing ratios of the diamine and diacid in percent by weight of an exemplary cycloaliphatic polyamide consisting of 4,4'-methylenebis(cyclohexylamine) and dodecanedioic acid is 1:1.09.

A cycloaliphatic polyamide is optionally coated onto or impregnated into, either partially or fully, a structural fiber, such as in the form of a cloth. A structural fiber optionally includes linear fibers that are directionally oriented, or randomly oriented. In general any material of which natural or synthetic fibers are present is suitable, however structural fiber material of polymers such as for example polyamide (aramid) or ultra high molecular weight polyethylene (polyethylene), glass, carbon, natural fibers or mineral fiber materials such as basalt fibers or ceramic fibers (oxide fibers based on aluminum oxides and/or silicon oxides) are optionally used. Mixtures of fiber types, such as for example fabric combinations of aramid- and polyethylene fiber, or carbon and glass fibers, can also be used. Likewise, hybrid composite components can be produced with prepregs from different fibrous supports.

A structural fiber is optionally a polyethylene fiber. Polyethylene fibers are ultra-strong, high-modulus fibers, and have a density much lower than that of aramid fibers. Well-known brand names for polyethylene fibers are Spectra® from Honeywell and Dyneema® from DSM, which have been widely used in composites for helmets and body armor applications.

A structural fiber is optionally an aramid fiber. Aramid fibers commonly have a specific strength and modulus of elasticity markedly lower than that of carbon fibers. Well-known brand names for aramid fibers are Nomex® and Kevlar® from DuPont, or Teijinconex®, Twaron® and Technora® from Teijin.

Glass fibers are optionally used owing in part to their relatively low cost. A glass fiber is optionally any type of glass-based reinforcing fiber, for example, E glass, S glass, R glass, M glass, C glass, ECR glass, D glass, AR glass, or hollow glass fibers.

In some aspects, carbon fiber is used, optionally in high performance composite materials where the lower density with at the same time higher strength compared to glass fibers is desired in some engineering structure applications. Carbon fibers are synthetic fibers from carbon-containing starting materials that are converted by pyrolysis to carbon in graphite-like configuration, which provide a higher density that polymer fibers.

Structural fibers made of glass fibers, carbon fibers, aramid fibers or ceramic fibers are particularly suitable.

An overview of structural fibers is contained in Composites Technologien, Paolo Ermanni (Version 4), Script for Lecture ETH Zürich, August 2007, Chapter 7.

In some aspects, the cycloaliphatic polyamide can be prepared in solvents to form dispersion for coating of select structural fibers, optionally to form prepeg materials. Each prepreg may include a single or multi-layer assembly of cross-plies with fibers at orientations of, for example, 0°/90°/0°/90°. Optionally, each individual prepreg ply optionally is of approximately the same thickness, for example approximately 0.15 mm and about 2-3 mm, optionally 6 μm-12 μm.

Also provided are energy dissipating composite materials that include a first layer including a poly(urethane urea) impregnated into a first structural fiber and a second layer formed of a cycloaliphatic polyamide impregnated into a second structural fiber substantially as described above. A first layer optionally includes a poly(urethane urea) (abbreviated as PUU) alone or coated on or impregnated into a structural fiber. PUU elastomers are thermoplastic, prepared from reaction of a diisocyanate, a diamine, and a polyol. In various aspects, the diisocyanate is optionally 4,4'-methylene diphenyl diisocyanate, isophorone diisocyanate, 4,4'-dicyclohexylmethane diisocyanate, or any mixture thereof. In some aspects, the diamine is optionally dimethyphenylenediamine, diethyltoluenediamine, 4,4'-methylenebis(cyclohexylamine), or any mixture thereof. In some aspects, a polyol is optionally poly(propylene oxide), poly(tetramethylene oxide), polycaprolactone diol, polycarbonate diol, or any mixture thereof. Illustrative examples of PUU materials and structural fiber reinforced PUU materials are illustrated in U.S. Patent Application Publication No: 2015/0072118.

Figure 3:
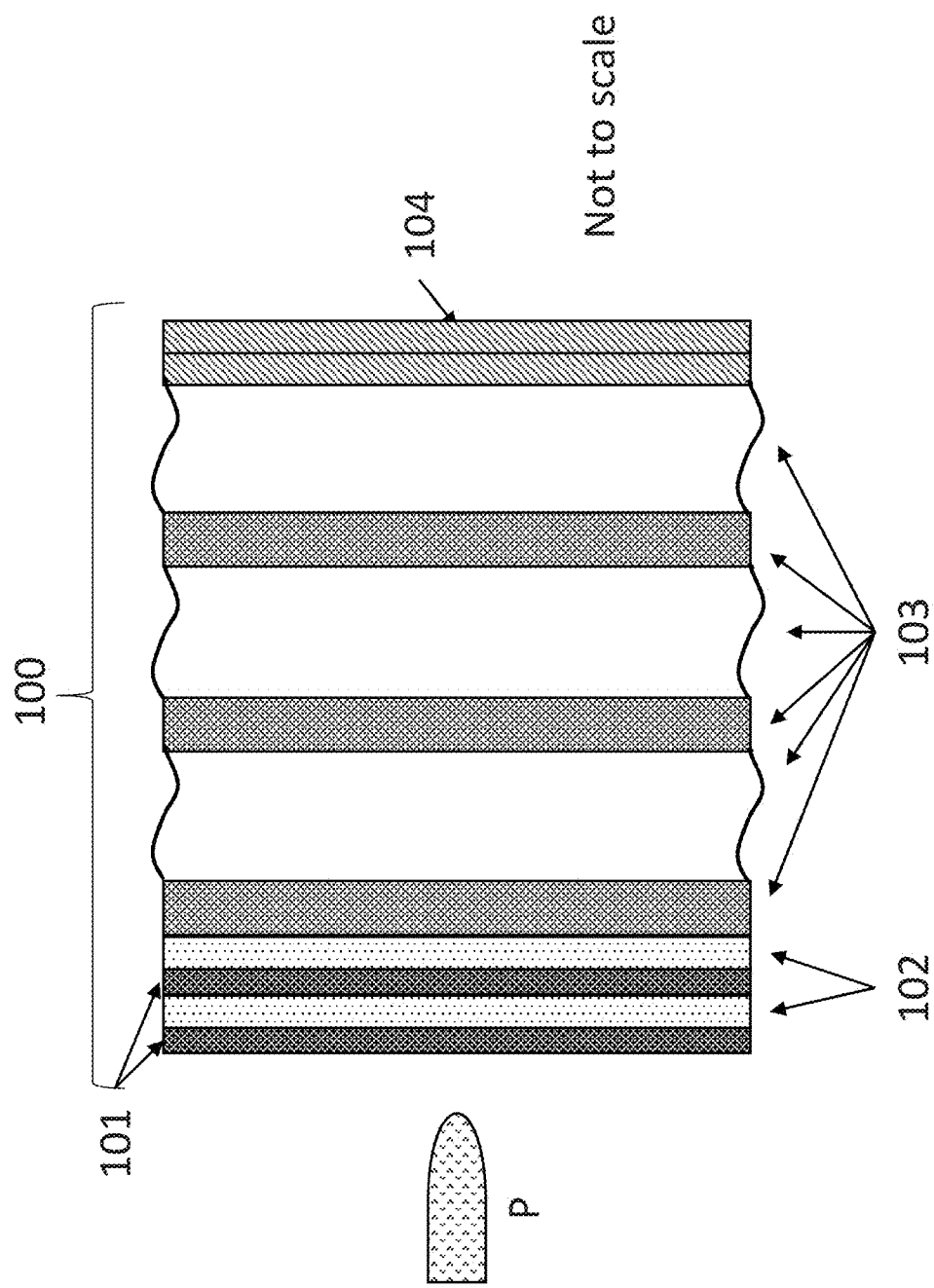
FIG. 3 illustrates a composite material according to one aspect.

FIG. 3 illustrates an exemplary composite material 100 oriented relative to a projectile P. In layers 101 and 102, each of thickness T2 and in layers 103, each of thickness T3, poly(urethane urea) elastomers optionally have moderate dynamic strain-rate hardening characteristics. Layer 101 is optionally formed of about 39 wt. % 4,4'-dicyclohexylmethane diisocyanate, about 13 wt. % diethyltoluenediamine, and about 48 wt. % poly(tetramethylene oxide), where the molecular weight of poly(tetramethylene oxide) is 650 g/mol, for example. Layer 102 is optionally formed of about 34 wt. % 4,4'-dicyclohexylmethane diisocyanate, about 14 wt. % diethyltoluenediamine, and about 52 wt. % poly(tetramethylene oxide), where the molecular weight of poly(tetramethylene oxide) is optionally 1,000 g/mol. Layer 103 is optionally formed of about 31-39 wt. % 4,4'-dicyclohexylmethane diisocyanate, about 10-14 wt. % diethyltoluenediamine, and about 48-59 wt. % poly(tetramethylene oxide), where the molecular weight of poly(tetramethylene oxide) is optionally 650-1,000 g/mol.

Layer 104 optionally a layer of cycloaliphatic polyamide of thickness T4. Thickness T4 is optionally 0.15 mm to about 2-3 mm or any value or range in between. In some aspects, layer 104 is a layer of structural fiber reinforced cycloaliphatic polyamide material such as polyethylene, carbon or aramid reinforced combination of an exemplary cycloaliphatic polyamide consisting of dodecanedioic acid and 4,4'-methylene-bis(cyclohexylamine) at a molar ratio of approximately 1:1.

It is appreciated that layer 104 is optionally positioned at any one or multiple positions within the composite material. In some aspects, layer 102 is or includes the cycloaliphatic polyamide layer. In some aspects, one or more of layers 103 are or include the cycloaliphatic polyamide layer. Thickness T1 is optionally 50-60 μm, T2 is optionally 50 μm to about 0.25-0.35 mm or any value or range in between, and T3 is optionally 0.15 mm to about 2-3 mm or any value or range in between. Optionally, a cycloaliphatic polyamide layer is not the external layer where an external layer is defined as the layer directed to an energy source such as a blast wave, projectile P or intended projectile.

It is further envisioned that these cycloaliphatic polyamide matrix prepregs are optionally on or directly on polyurethane- and/or poly(urethane urea)-based prepreg(s) in the form of a multi-layer construct, where adhesion between prepreg layers is adequate for fabrication and consolidation into a helmet (or other article) structure, wherein ballistic impact energy absorption/dissipation, shock stress wave mitigation, mode of deformation, as well as thermo-mechanical strength can be optimized.

As such, also provided are articles that include a cycloaliphatic polyamide material infused into or coated onto one or more structural fibers. An article is optionally used as a combat helmet, armor for wear by a soldier or other, armor for a vehicle, protective face shields, or other use that will benefit from projectile energy absorption and dissipation. In some aspects, an article includes those described in U.S. Patent Application No: 2015/0072118 in similar conformations and optionally employing similar structures and materials, optionally where one or more layers of cycloaliphatic polyamide films or structural fiber reinforced cycloaliphatic polyamide layers are located behind an outer or other layer relative to an expected energy source.

Each layer of a composite assembly is optionally positioned with the outer-most layers to both the exterior and interior of the helmet comprising approximately the same thickness, optionally about 0.5-2 mm. The total number of prepreg plies, as well as the details of the layup, may be selected according to area density and/or performance specification requirements. For some applications, the prepregs may be consolidated following a commercial molding cycle process per manufacturer's recommendation for fabrication of composites for helmets in accordance with the detailed military specification, MIL-DTL-62474F.

A layered composite material optionally is or includes a prepeg of two-layer assembly or a four-layer assembly of cross-plies with fiber orientation at 0°/90° and 0°/90°/0°/90°, respectively. Each individual layer may have approximately the same thickness, for example, about 6-12 µm. An article or composite material is optionally formed of a plurality of such layers, optionally from 2 to 50 or more layers, or any value or range therebetween. Optionally, an article of composite material includes 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 layers.

In some aspects, and article is a helmet optionally an Advanced Combat Helmet (ACH) or Enhanced Combat Helmet (ECH) system used by the U.S. military. Potential applications of the cycloaliphatic polyamide materials, structural fiber reinforced cycloaliphatic polyamide materials such as prepegs or other forms, optionally include but are not limited to matrices for composites, spall layers for ECH helmets, spall layers for impact resistant shields and blast shields, spall layers for structural retrofits for homeland security and government buildings, spall layers for lightweight anti-riot shield, spall layers for ceramic-based composite integral armor, composites for helicopter structure components, composites for building and infrastructure, composites for compressed gas storage, composites for vehicles, composite for industry equipment, and composites for wind turbines.

The provided structural fiber reinforced thermoplastic cycloaliphatic polyamide-matrix composites alone or in conjunction with other fiber reinforced elastomer-matrix composites provide synergistic benefits for enhanced protection against ballistic impact and shock waves, as well as for enhanced protection against ballistic helmet blunt trauma and mild traumatic brain injury. Such synergistic benefits may be destroyed or inhibited by the presence of a matrix material that does not exhibit intramolecular hydrogen bonding and cycloaliphatic conformations that can undergo cooperative rearrangement following impact. As such, an article optionally excludes any material, such as resin or other matrix material, that is incapable of cooperative rearrangement of intramolecular hydrogen bonding and cycloaliphatic conformations upon impact. An article optionally excludes polycarbonate(s), metal(s), glass, or ceramic material(s).

Various aspects of the present invention are illustrated by the following non-limiting examples. The examples are for illustrative purposes and are not a limitation on any practice of the present invention. It will be understood that variations and modifications can be made without departing from the spirit and scope of the invention. Reagents illustrated herein are commonly cross reactive between mammalian species or alternative reagents with similar properties are commercially available, and a person of ordinary skill in the art readily understands where such reagents may be obtained.

EXPERIMENTAL

A digital imaging correlation technique was used to measure the real-time local deformation strain of TROGAMID polyamides upon ballistic impact. The objective was to utilize the real-time local strain deformation measurements for further correlation and validation of ballistic impact deformation response observed in two transparent polyamide materials.

Injection-molded, ¼-in-thick plaques of transparent TROGAMID T-5000 (polyphthalamide, which is a reaction product of terephthalic diacid and/or isophthalic diacid with either t-butyl hexamethylene diamine or trimethyl hexamethylene diamine) and TROGAMID CX-7323 (dodecanedioic acid/4,4'-methylene-bis(cyclohexylamine)) materials were used for ballistic impact evaluation; both TROGAMID polymers were manufactured by Evonik Degussa High Performance Polymers.

Ballistic impacts measurements were carried out with a 17-gr (1.1-g), 0.22-cal. fragment simulating projectile. The gas gun was pressurized at different pressures with helium gas to propel the projectile to reach select impact velocities. The speed of the projectile was tracked with a Doppler radar (BR-3502, Infinition, Inc.). The polyamide target (3.5×3.5× ¼ in) was sandwiched in a target frame with a circular opening of 3 inches in diameter. The targets were spray painted with a random pattern of white and black dots. The dot size that appeared on the digital image was about 8 pixels in diameter.

Two high-speed cameras (Photron SA1, Photron USA, Inc.) were used to generate stereo image pairs of the impact area. The two cameras were placed behind the target fixture. Details of the camera setup and images collection can be found in Yu et al., *Proceedings of the American Society for Composites,* 2009-24th Technical Conference, University of Delaware, Newark, Del., 15-17 Sep. 2009 and Yu and Dehmer (ARL-TR-5212; U.S. Army Research Laboratory: Aberdeen Proving Ground, MD, June 2010). The stereo images were analyzed using the commercially available photogrammetric software program ARAMIS (GOM GmbH, Germany, distributed by Trilion Quality Systems in the U.S.). The cameras were calibrated with a series of standard dot images (Schmidt, et al., *Exp. Techniques* 2003 47-50, Yu and Dehmer (ARL-TR-5212; U.S. Army Research Laboratory: Aberdeen Proving Ground, MD, June 2010)). ARAMIS has a built-in algorithm for calculating the displacement. Details of the data analysis, including the determination of the displacement measurement sensitivity and the strain calculation sensitivity, can be found in Yu et al. (*Proceedings of the American Society for Composites,* 2009-24th Technical Conference, University of Delaware, Newark, Del., 15-17 Sep. 2009) and Schmidt, et al., *Exp. Techniques* 2003 47-50. The ARAMIS software allows for calculation of displacement history in the transverse direction ($\varepsilon_{xx}$ and $\varepsilon_{yy}$) as well as the corresponding shear component ($\varepsilon_{xy}$).

Figure 4B:
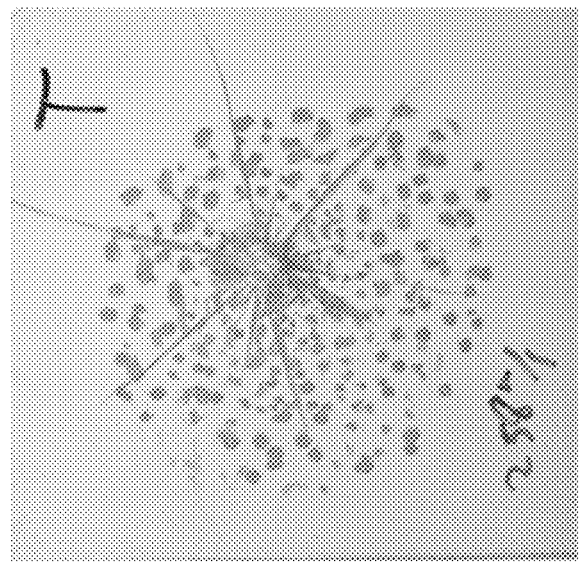
FIG. 4B illustrates ballistic impact results of control material TROGAMID T-5000, where the target was spray-painted with a random pattern of colored dots required for the digital-image correlation analysis.
Figure 4A:
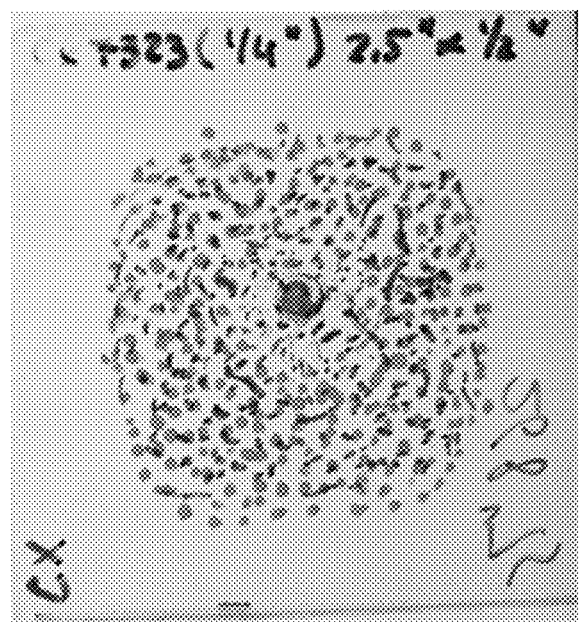
FIG. 4A illustrates ballistic impact results of an exemplary cycloaliphatic polyamide material TROGAMID CX-7323, where the target was spray-painted with a random pattern of colored dots required for the digital-image correlation analysis.

TROGAMID T-5000 and TROGAMID CX-7323 exhibited similar $V_{50}$ values despite their difference in ballistic impact mode of failure. The $V_{50}$ velocity is a statistical value which is typically regarded as the velocity, where the projectile has a 50% probability of completely penetrating through the target at normal incidence of impact. Exemplary impact results are depicted in FIG. 4. In order to better understand the role of microstructure on the overall ballistic impact performance, it is important to first quantify and compare the dynamic deformation response between the two TROGAMID polyamide materials.

Figure 5:
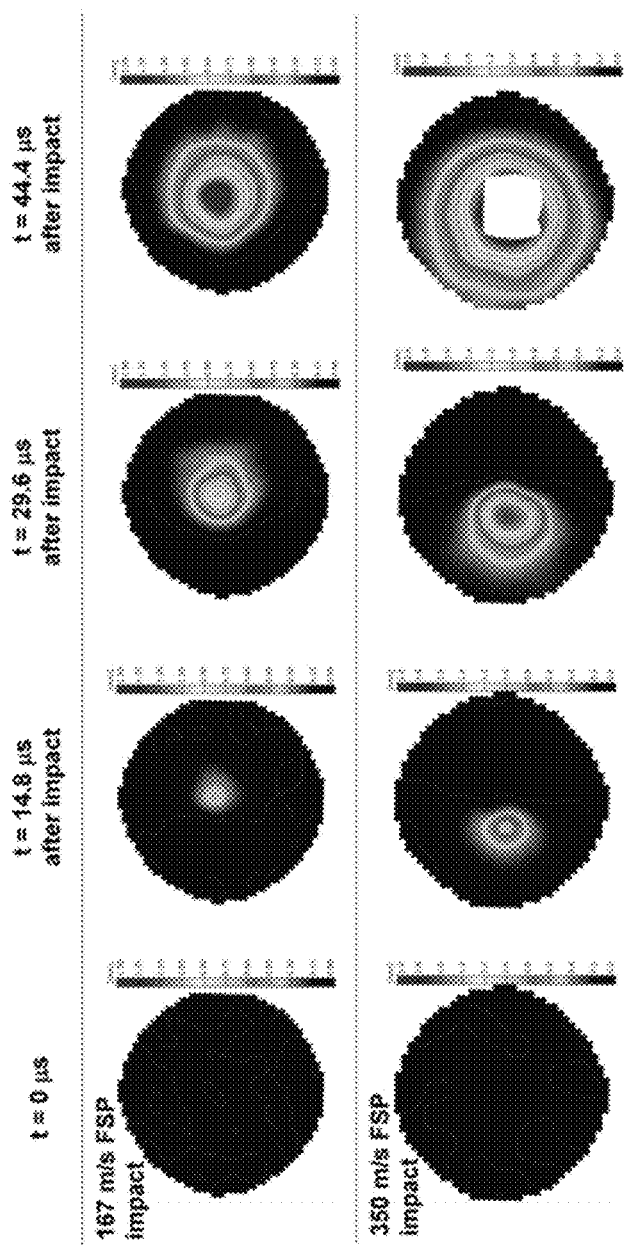
FIG. 5 illustrates the time history of the exemplary cycloaliphatic polyamide material deformed surfaces of the TROGAMID CX-7323 targets.
Figure 6:
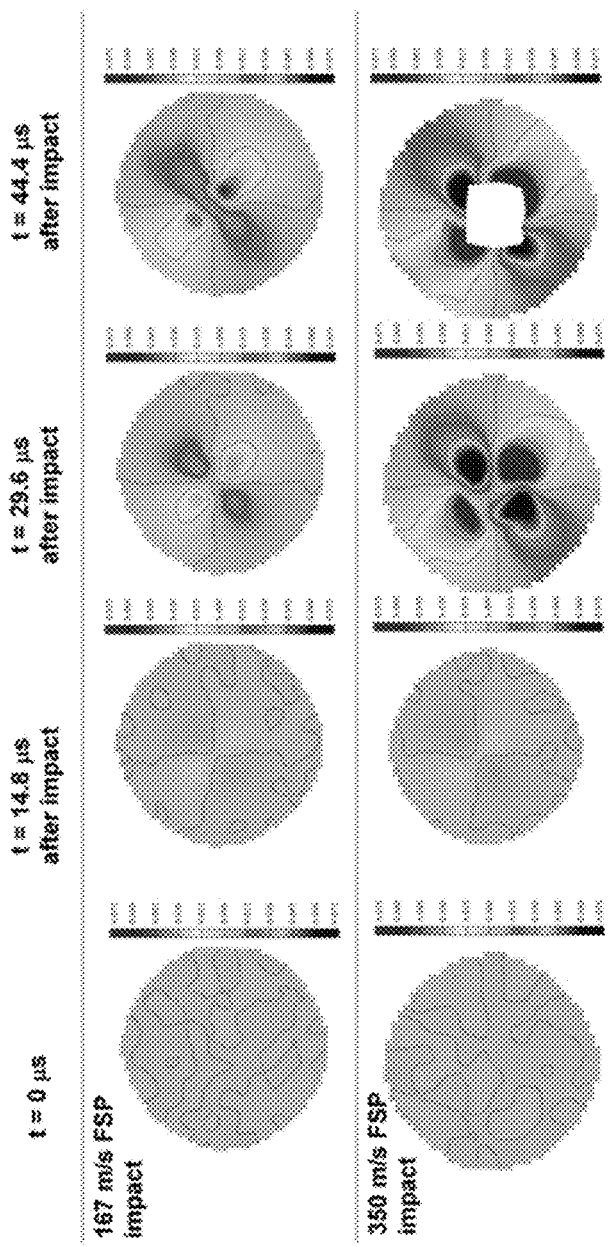
FIG. 6 illustrates the surface shear strain of the deformed surfaces of the exemplary cycloaliphatic polyamide material TROGAMID CX-7323 targets.

FIG. 5 shows the time history of the deformed surfaces of the TROGAMID CX-7323 targets, which were impacted against a 0.22-cal. FSP at 167 and 350 m/s. The full-field, out-of-plane displacement profiles reveal the progress in the extent of dynamic deformation with increasing impact velocity. Initiation of failure, indicated by a discontinuity in the displacement history profiles, occurs as expected at shorter time upon impact at higher velocity. The ARAMIS software also allows for calculation of the shear strain deformation. FIG. 6 displays the surface shear strain of TROGAMID CX-7323 at times after impact.

Figure 7:
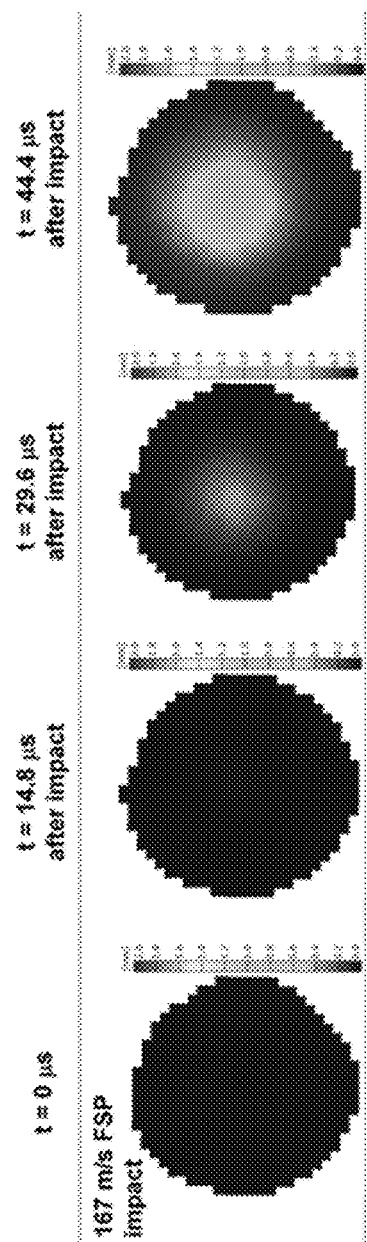
FIG. 7 illustrates the time history of the deformed surfaces of the TROGAMID T-5000 targets.
Figure 8:
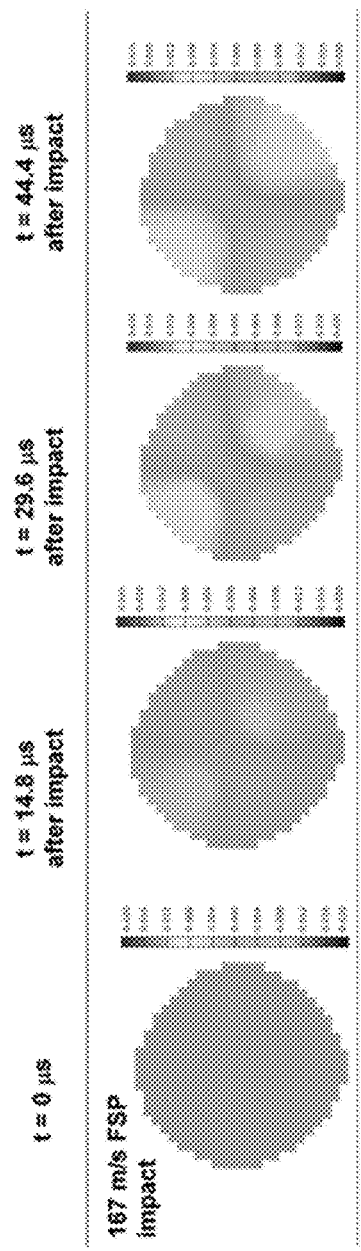
FIG. 8 illustrates the surface shear strain of the deformed surfaces of the TROGAMID T-5000 targets.

The extent of out-of-plane displacement in TROGAMID CX-7323 is more significant in comparison with the corresponding time history plot shown in FIG. 7 for TROGAMID T-5000. Similarly, TROGAMID CX-7323 exhibits greater shear deformation in comparison with TROGAMID T-5000, as shown in FIG. 8.

Figure 9:
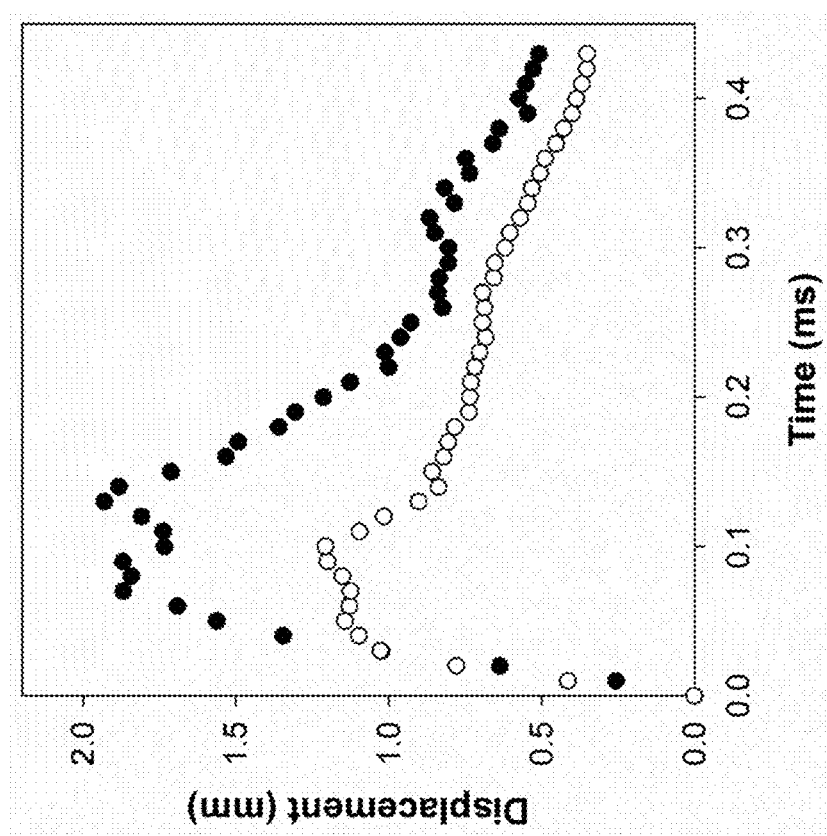
FIG. 9 compares the surface displacement history data obtained for TROGAMID CX-7323 (filled circles) and TROGAMID T-5000 (empty circles) at impact velocity of about 167 m/s.
Figure 10:
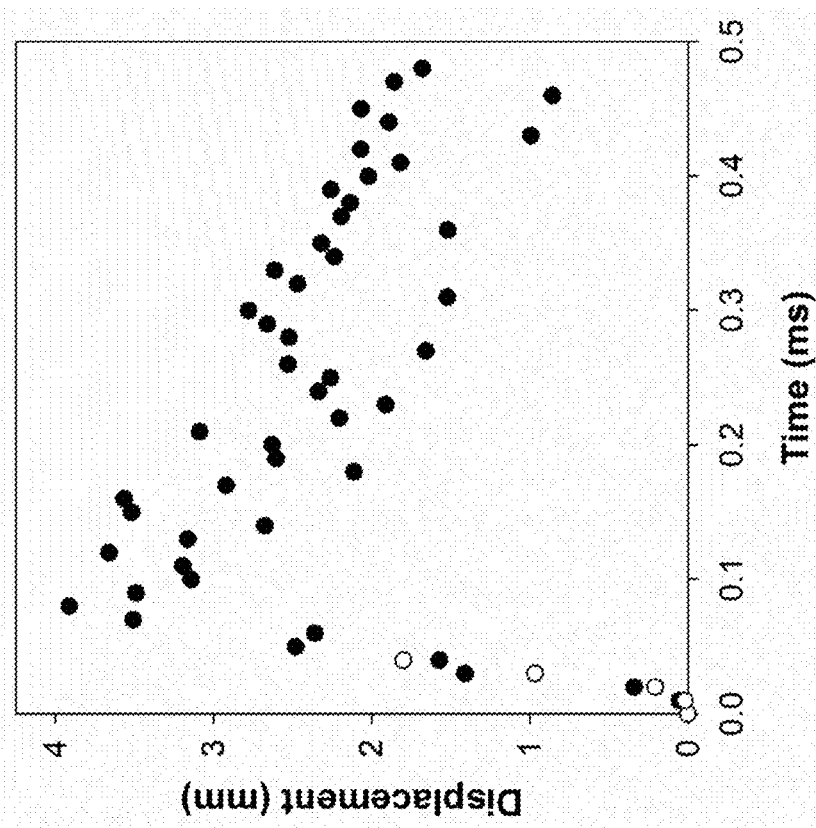
FIG. 10 compares the surface displacement history data obtained for TROGAMID CX-7323 (filled circles) and TROGAMID T-5000 (empty circles) at impact velocity of about 268 m/s.

FIG. 9 compares the surface displacement history data obtained for TROGAMID CX-7323 (filled circles) and TROGAMID T-5000 (empty circles) at impact velocity of about 167 m/s. Both materials exhibit similar deformation until ~30 μs after impact, and thereafter TROGAMID CX-7323 continues to deform, suggesting TROGAMID CX-7323 is more flexible than TROGAMID T-5000. This is consistent to the quasi-static mechanical properties. As impact velocity further increases to 268 m/s, the initial rate of deformation appears to be similar, while the maximal surface displacement increases in both TROGAMID CX-7323 (filled circles in FIG. 10) and TROGAMID T-5000 (empty circles in FIG. 10). TROGAMID CX-7323 remains intact; however, TROGAMID T-5000 appears close to the failure limit at about 40 μs after impact. These observations clearly validate that TROGAMID CX-7323 exhibits noticeably ductile deformation in comparison to TROGAMID T-5000, despite their similar $V_{50}$ values.

Figure 11:
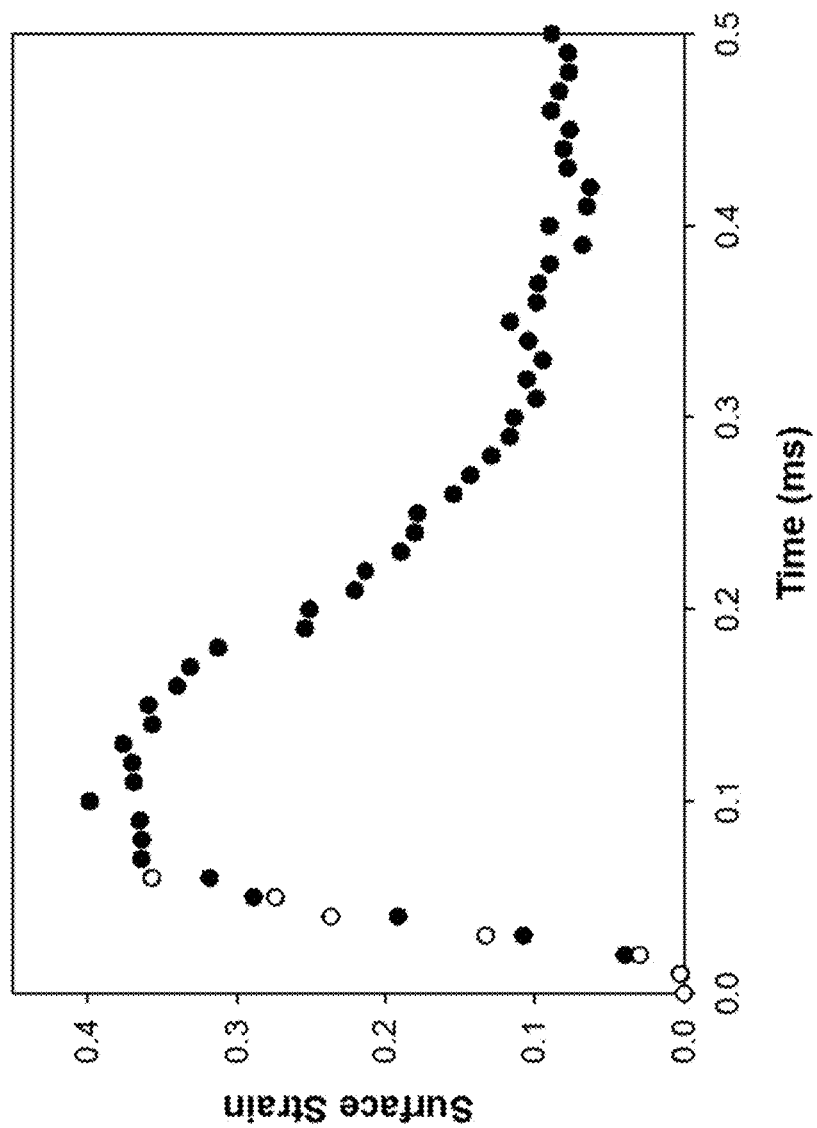
FIG. 11 compares dynamic strengthening capability obtained for TROGAMID CX-7323 at impact velocity of 350 m/s (filled circles) in comparison with polycarbonate (empty circles) where projectile penetration occurs in polycarbonate but not in TROGAMID CX-7323 once deformation strain exceeds ~0.36 at the same impact velocity.

FIG. 11 compares the surface displacement history data obtained at impact velocity of about 350 m/s for TROGAMID CX-7323 (filled circles) and polycarbonate (empty circles). Both materials exhibit similar deformation until ~60 μs after impact, and thereafter perforation occurs in polycarbonate yet TROGAMID CX-7323 continues to deform, suggesting TROGAMID CX-7323 is more prone to dynamic strengthening than polycarbonate. This is presumably due to the cooperative cycloaliphatic conformation changes along with intermolecular hydrogen bonding, which are present in TROGAMID CX-7323 but not in polycarbonate.

Figure 12:
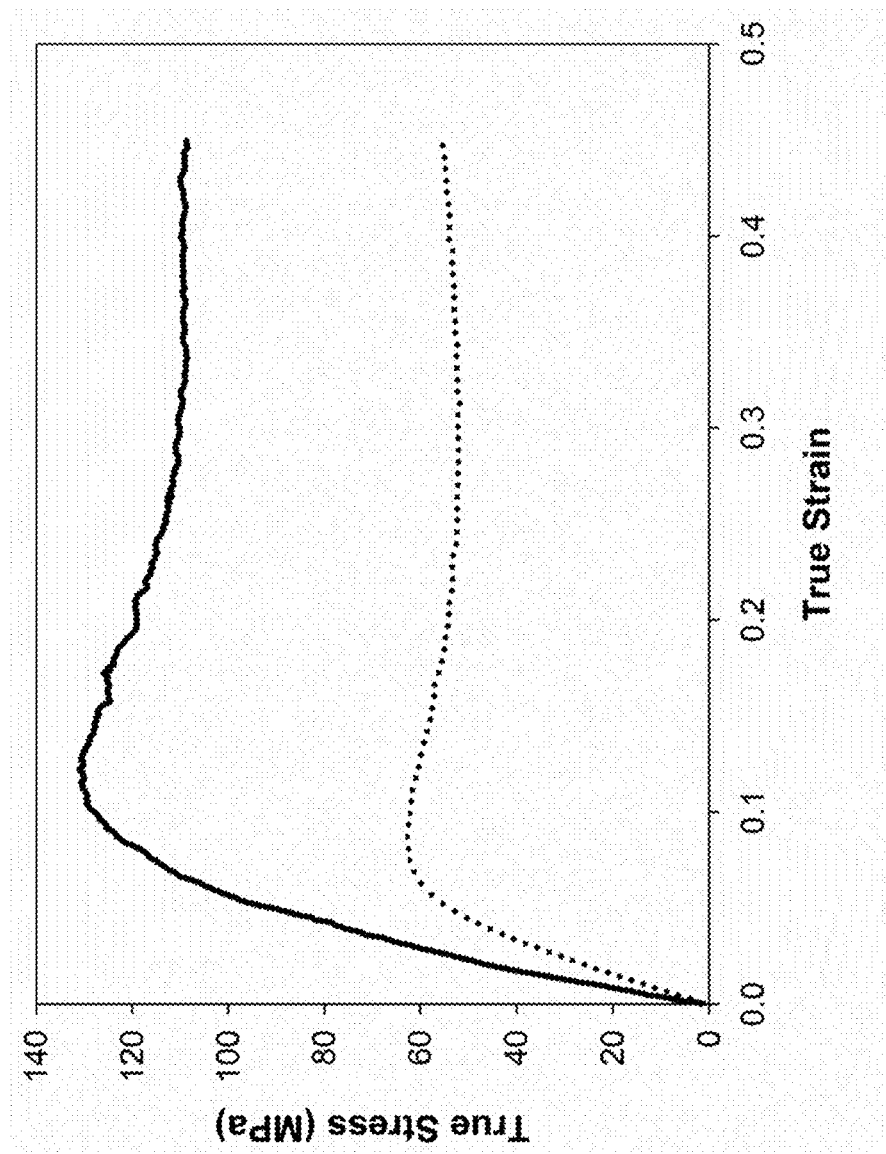
FIG. 12 compares dynamic stress versus strain data obtained for TROGAMID CX-7323 at a strain rate of 2200/s (solid line) with compressive stress data obtained from compression measurement at a strain rate of 0.01/s (dotted line).

To better quantify the extent of the dynamic mechanical strengthening characteristics exhibited by cycloaliphatic polyamides, dynamic stress versus strain measurements were conducted by using split Hopkinson pressure bar impact measurements. Details of the experimental techniques and data analysis for the split Hopkinson pressure bar impact measurements can be found in Moy et al., *Proceedings of the* 2003 *ASME IMECE:* 2003 *ASME INTERNATIONAL MECHANICAL ENGINEERING CONGRESS AND R&D EXPO* Nov. 15-21, 2003 Washington, D.C. The impact measurements were conducted with high strength aluminum bars to provide adequate amplitude and duration of the incident pulse, capable of resulting in strain rates in the range of 1000-4000/s. The dynamic stress versus strain data obtained for TROGAMID CX-7323 at a strain rate of 2200/s are shown in FIG. 12, which clearly reveal a significant increase in the extent of the true stress, about two times at the plateau stress, in comparison with the plateau compressive stress of TROGAMID CX-7323 obtained from compression measurement at a strain rate of 0.01/s.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

We claim:

1. A helmet that decreases back face deflection when engaged by a projectile, wherein the helmet comprises:
   a first layer; and
   a second layer on said first layer, said second layer comprising a thermoplastic cycloaliphatic polyamide matrix surrounding a woven fabric wherein back face deflection when engaged by a projectile is reduced based on
   a moderate dynamic strain-rate hardening of the poly (urethane urea) and
   a dynamic strengthening response of the cycloaliphatic polyamide via a transition between transient isomer conformations of the cycloaliphatic moiety.

2. The helmet of claim 1 wherein said thermoplastic cycloaliphatic polyamide is amorphous and saturated.

3. The helmet of claim 1 wherein said composite material excludes resin absent intermolecular hydrogen bonding.

4. The helmet of claim 1 excluding polycarbonate.

5. The helmet of claim 1 wherein said thermoplastic cycloaliphatic polyamide comprises a structure as a result of a stoichiometric reaction between a diamine and a diacid.

6. The helmet of claim 5 wherein said diamine is selected from the group consisting of: hexamethylenediamine; 1,4-phenyl-diamine (para-phenylenediamine); 1,3-phenyl-diamine (m-phenylenediamine); 1,4-diaminocyclohexane; 1,3-diaminocyclohexane; m-xylylenediamine; 4,4'-methylenebis(cyclohexylamine); 2,2,4-trimethyl hexamethylene diamine; 2,4,4-trimethyl hexamethylene diamine; and any mixture thereof.

7. The helmet of claim 5 wherein said diacid is selected from the group consisting of: terephthalic acid; isophthalic acid; succinic acid; glutaric acid; adipic acid; sebacic acid; dodecanedioic acid; azelaic acid; trimethyl adipic acid; 1,4-cyclohexanedicarboxylic acid; 1,3-cyclohexanedicarboxylic acid; and any mixture thereof.

8. The helmet of claim 1 wherein said poly(urethane urea) is formed of 4,4'-dicyclohexylmethane diisocyanate, diethyltoluenediamine, and poly(tetramethylene oxide).

9. The helmet of claim 1 wherein said first layer is positioned outside of said second layer.

10. The helmet of claim 1, wherein said cycloaliphatic polyamide is characterized by compressive flow stress values at strain rates of 2,200 per second that are higher in comparison with compressive flow stress values at strain rates of 0.01 per second.

11. A helmet that decreases back face deflection when engaged by a projectile, wherein the helmet comprises:
   a first layer; and
   a second layer on said first layer, said second layer comprising a thermoplastic cycloaliphatic polyamide matrix surrounding a woven fabric wherein back face deflection when engaged by a projectile is reduced based on
   a moderate dynamic strain-rate hardening of the poly (urethane urea) and a dynamic strengthening response of the cycloaliphatic polyamide via a transition between transient isomer conformations of the cycloaliphatic moiety
   further comprising pads.

* * * * *